Aug. 21, 1962          B. MOLIS          3,050,153
LIFT TRUCK WITH ARTICULATED POWER UNIT
Filed Oct. 15, 1959          3 Sheets-Sheet 1
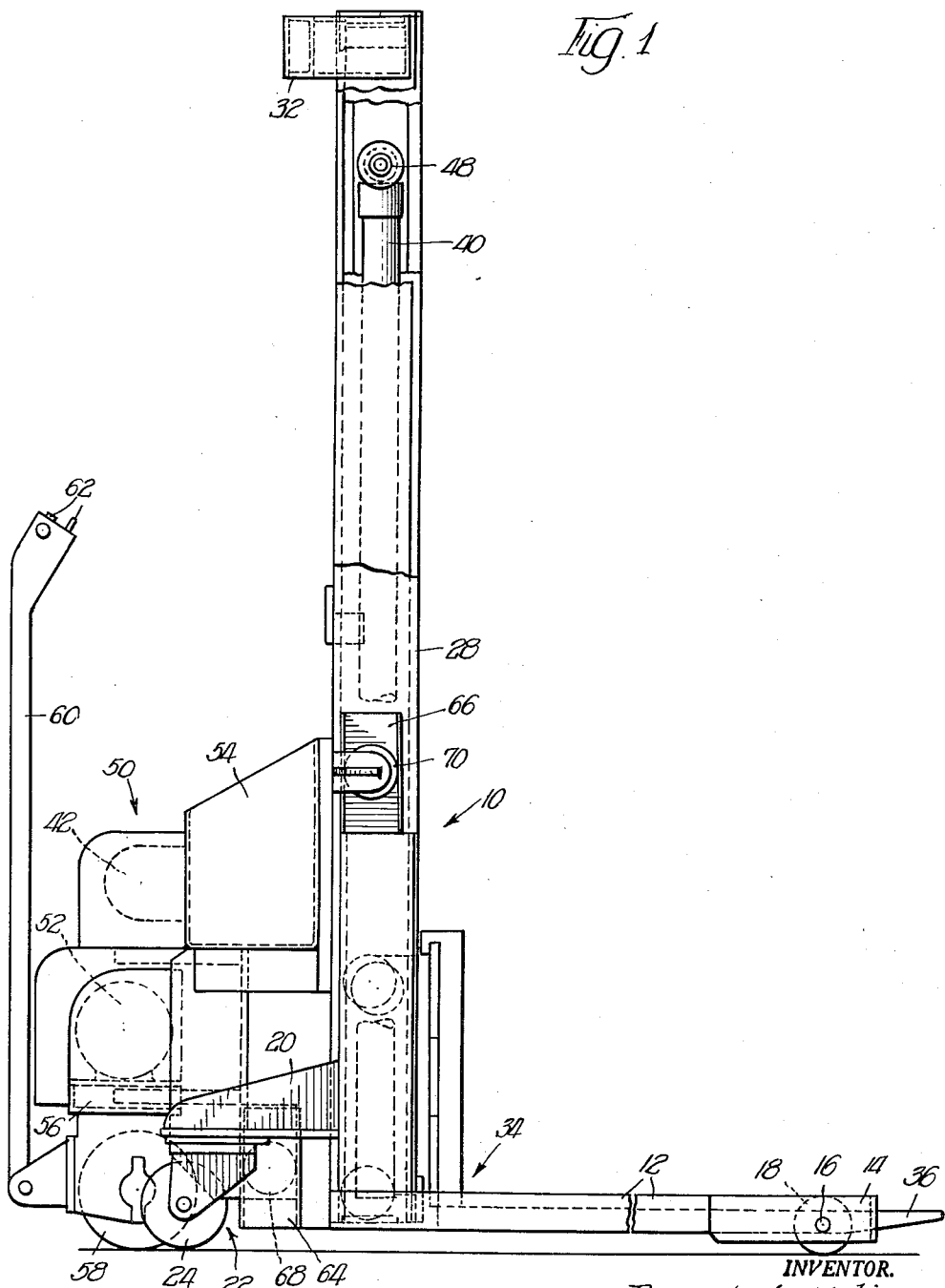
INVENTOR.
Benedict Molis,
BY
Byron, Hume, Groen & Clement
Attys.

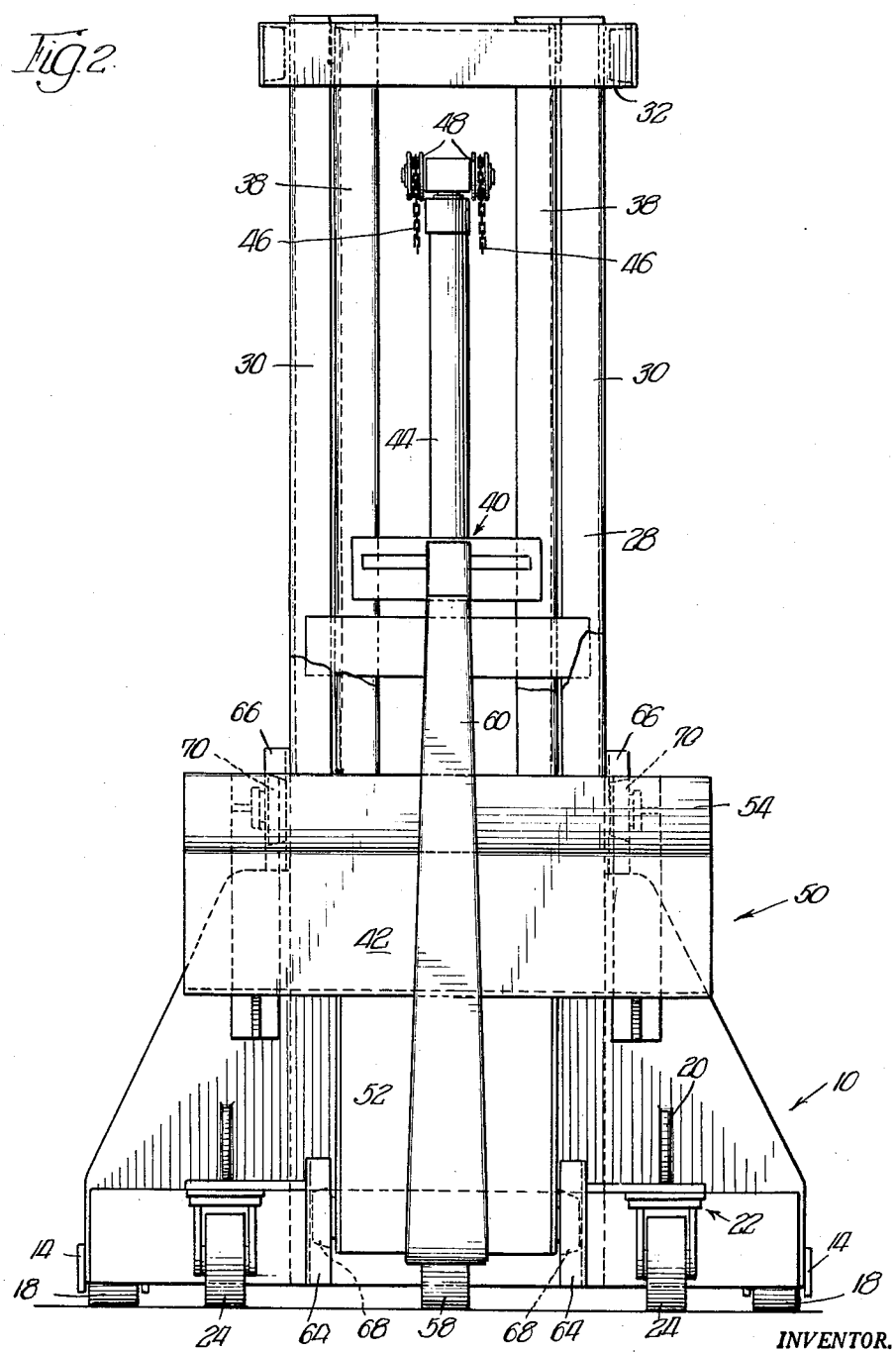

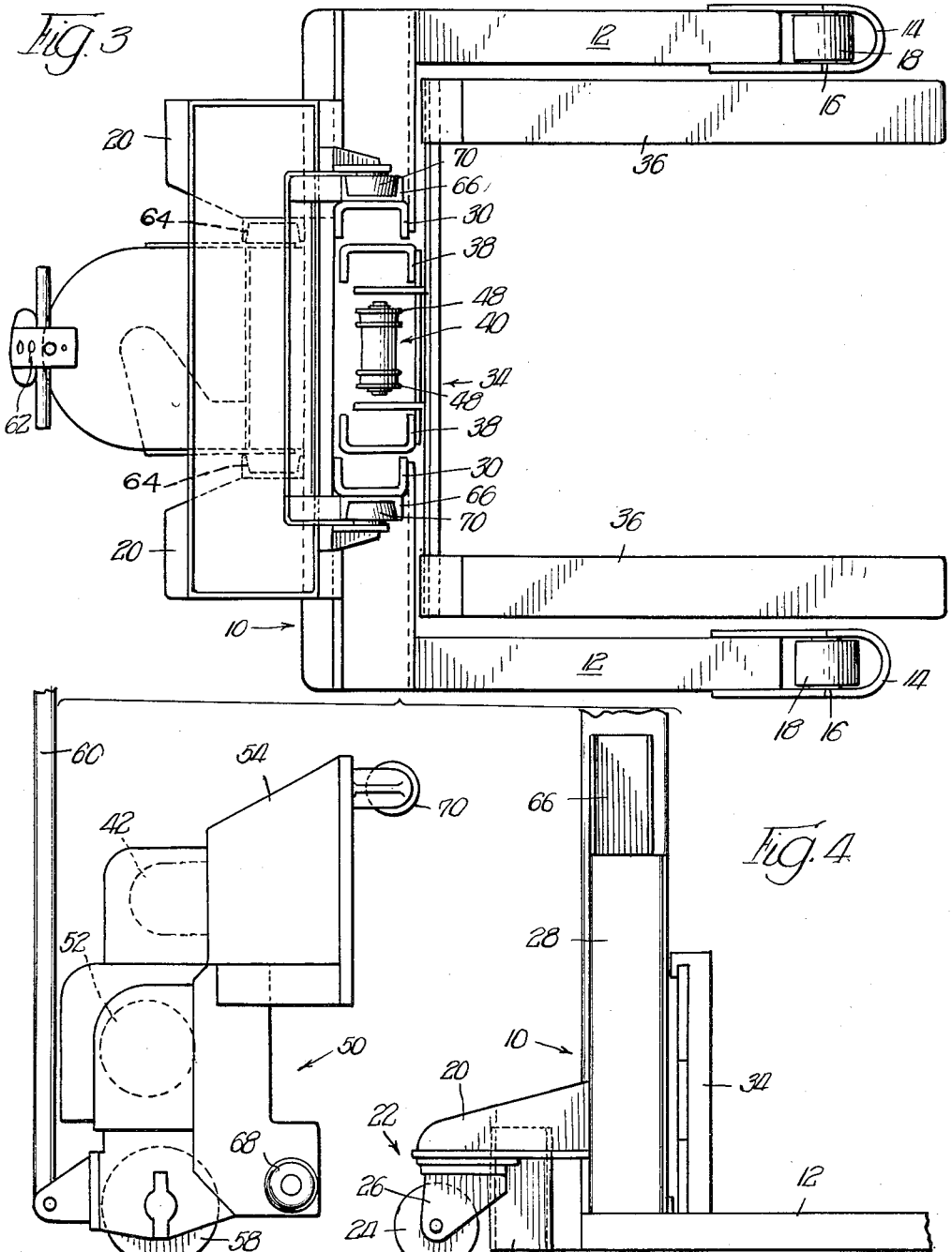

United States Patent Office 3,050,153
Patented Aug. 21, 1962

3,050,153
LIFT TRUCK WITH ARTICULATED POWER UNIT
Benedict Molis, Lake Villa, Ill., assignor to Economy Engineering Company, Chicago, Ill., a corporation of Illinois
Filed Oct. 15, 1959, Ser. No. 846,612
6 Claims. (Cl. 187—9)

This invention relates to industrial lift trucks in which a lifting fork assembly or elevating platform is adapted to be raised by hydraulic type lifting mechanism.

More particularly, the invention relates to fork lift trucks adapted to be propelled by one or more traction or drive wheels.

One of the problems encountered in using fork lift trucks is the loss of traction, due to unevenness of the ground or floor over which the truck travels, thereby causing the truck to become stalled.

By vertically articulating the traction or drive unit with the main frame and load carrying unit of the truck the drive wheels may be maintained in driving engagement with the ground, despite the irregularity of most surfaces encountered.

It is, therefore, the general purpose of my invention to provide an industrial lift truck capable of maintaining traction for carrying loads over floors having an irregular surface.

It is a further object of my invention to provide the necessary traction between the drive wheel and uneven ground by vertically articulating the traction unit with the main frame of the lift truck.

It is yet a further object of my invention to provide a lift truck in which the battery box and drive unit are mounted above the articulated drive unit in a common frame, so that such extra weight will contribute to the traction of the drive wheel, whereby the truck may be operated on an inclined plane such as a ramp.

A feature of this articulated relationship between the traction unit and the main frame of the lift truck is the provision of upper and lower guide wheels mounted on the traction unit for rolling engagement with and retention by tracks on the main frame.

In order to more clearly illustrate my invention, a preferred embodiment thereof is shown in the accompanying drawings in which:

FIGURE 1 is a side elevational view of a truck embodying the invention;
FIGURE 2 is a front view in elevation of the truck;
FIGURE 3 is a plan view in elevation of the truck; and
FIGURE 4 is an exploded view of certain basic parts of the truck.

Referring now to the drawings, the fork lift truck embodying the present invention includes a main frame assembly, generally denoted by the numeral 10. The main frame assembly 10 includes a pair of forwardly extending supporting legs 12 which ride substantially parallel to the surface over which the lift truck traverses. Each of the supporting legs 12 is provided at its forward end with a reverse yoke 14 in which is positioned the axle 16. A load wheel 18 is rotatably mounted on each of the axles 16 and is adapted to engage the ground or other surface on which the truck traverses.

The main frame also includes a pair of arms 20 which extend in a rearward direction. A caster assembly 22 including the wheel 24 and the yoke 26 is pivotally secured to each of the arms 20 in ground engaging position.

A mast 28 is included in the main frame and is secured by conventional means such as welding, rivets, bolts, and the like, to the legs 12 and the arms 20, as shown in the drawings. The mast 28, as viewed in FIGURE 1, consists of a pair of parallel vertical members 30 at a height suitable for the operation of the lift truck. The vertical members 30 are secured at the top by a collar 32. As can be seen from FIGURE 3, the vertical members 30 are of a channel construction and are mounted in opposing relationship so that the flanges face inwardly. A fork assembly 34 including the fork members 36 is operably associated with the frame assembly and particularly the mast 28. The fork members 36 are secured in a conventional manner to a pair of upright members 38 which are adapted to ride within the mast assembly. The fork assembly 34 and specifically the fork members 36 may be vertically adjusted by means well known in the art. For example, as shown in the drawings, one such means includes a hydraulic jack 40 which is adapted to raise and lower the vertical members 38 and in turn the entire fork assembly 34. The hydraulic unit includes a pump and motor assembly, shown generally at 42, and a cylinder 40 which raises the fork assembly 34 by means of leaf chains 46 passing over sheaves 48.

The lift truck includes a drive unit assembly, generally denoted by the numeral 50, and which is adapted to be connected to the main frame assembly 10, as will be fully described hereinafter. The drive assembly 50 includes a suitable electric motor 52 which is driven by means of a battery 54 of some conventional type mounted on the drive assembly 50. The drive from the electric motor 52 is accomplished by means of the gearbox 56 which is drivingly connected to a drive wheel 58. The drive wheel 58 is pivotally mounted so that it may be rotated about its vertical diameter by the steering tongue 60. The steering tongue 60 is pivotally fastened at its lower end and adapted for rotation between the vertical and horizontal positions to accommodate the height of the operator and also to be placed in a vertical inoperative position when the truck is not in use. At the end of the steering tongue 60 are the controls 62 which are adapted to actuate the electric motor 52 and the hydraulic unit 40. The control unit end of the steering tongue 60 may be of conventional design and construction.

As was mentioned previously, one of the problems encountered with tis type of lift truck is maintaining the drive wheel in driving engagement with the supporting surface. This problem is extremely critical in many factories due to the unevenness of the surface and is magnified by the fact that the floors are many times oily or at least of a nature that has a low coefficient of friction. Suitable traction becomes even more important when it is desired to conduct the truck up an inclined ramp. This problem is solved by the unique manner in which the drive unit assembly 50 is connected to the main frame assembly 10.

The main frame 10 includes a pair of vertically mounted lower channel members 64 which are in facing relationship, as shown in FIGURE 3, and a pair of outwardly facing upper channel members 66 which are also mounted in a vertical direction. The lower channel members 64 are adapted to receive the outwardly facing beveled wheels 68 which are rotatably mounted on the drive unit assembly 50. Similarly, the upper channel members 66 receive the inwardly facing beveled wheels 70 which are mounted on the drive unit assembly 50. This arrangement permits vertical movement of the drive unit assembly 50 and the main frame assembly 10 with respect to each other.

Thus, if the truck should encounter a depression in the supporting surface, then the drive unit 50 may drop down so that the drive wheel 58 remains in engagement with the surface. It will be noted that the weight of the motor 52, battery 54, as well as the structural and supporting members comprising the drive unit 50 will force the drive wheel 58 into driving engagement with the surface to maintain traction. Conversely, if the main frame assembly should encounter a ground irregularity, then it may be either elevated or dropped to remain in ground engaging position, at the same time leaving the drive wheel 58 in driving relationship with the surface.

Again, the added weight on the drive assembly 50 due to the motors 42 and 52 and the battery 54 result in providing sufficient traction for conducting the truck up an inclined surface or ramp.

Another feature of this invention that is a direct result of the articulated connection between the main frame assembly 10 and the drive assembly 50 is the distribution of the load supported by the forks 36. One of the problems encountered in lift trucks is the fact that if the truck encounters an irregularity in the supporting surface, there may be a tendency for the unit to tip. As a result of the articulated arrangement, substantially all of the supporting wheels as well as the drive wheel are maintained in engagement with the ground. Thus, the load will be supported at all times so that there is no tendency for the lift truck to tip due to the fact that one or more of the wheels, particularly at the ends of the main frame or the drive assembly, are out of contact with the ground.

It can now be seen that the subject invention provides a simple but effective means for insuring driving contact between the drive wheel and the surface being traversed, regardless of irregularities in the latter. This construction may be utilized in conjunction with conventional designs followed in the manufacture and assembly of lift trucks. It is further apparent that the invention does not detract from the efficiency of the truck or require any special manipulations on the part of the operator.

While the arrangement of the invention described herein is at present considered to be preferred, it is understood that variations and modifications may be made therein, and it is intended to cover in the appended claims all such variations and modifications as fall within the true spirit and scope of the invention.

What is claimed is:

1. A fork lift truck comprising a main frame assembly, a pair of load wheels supporting one end of said main frame, a pair of caster wheels supporting the other end of said main frame, a pair of upper channel members mounted on said main frame assembly, a pair of lower channel members mounted on said main frame assembly, a power unit assembly, a drive wheel pivotally supporting said power unit assembly, a steering member connected to said drive wheel, motor means mounted within said drive unit assembly in driving engagement with said drive unit assembly, and upper and lower guide rollers mounted on said drive unit for rolling engagement with said upper and lower channel members of said main frame assembly, whereby said drive unit may be vertically articulated with said main frame and said drive wheel may maintain traction for driving said truck.

2. A fork lift truck comprising a main frame assembly, a pair of load wheels supporting one end of said main frame, a pair of caster wheels supporting the other end of said main frame, a mast mounted on said main frame, a lifting fork carried and supported by said mast, a pair of upper channel members mounted on said main frame assembly, a pair of lower channel members mounted on said main frame assembly, a power unit assembly, a drive wheel pivotally supporting said power unit assembly, a steering member connected to said drive wheel, motor means within said drive unit assembly in driving engagement with said drive wheel, a battery mounted on said drive unit assembly, and upper and lower guide rollers mounted on said drive unit for rolling engagement with said upper and lower channel members of said main frame assembly, whereby said drive unit may be vertically articulated with said main frame and said drive wheel may maintain traction for driving said truck.

3. A fork lift truck comprising a main frame assembly, a pair of load wheels supporting one end of said main frame, a pair of caster wheels supporting the other end of said main frame, a mast mounted on said main frame, a lifting fork carried and supported by said mast, a pair of upper channel members mounted on said main frame assembly, a pair of lower channel members mounted on said main frame assembly, said upper and lower channel members being vertically related with respect to said main frame, a power unit assembly, a drive wheel pivotally supporting said power unit assembly, a steering member connected to said drive wheel, motor means mounted within said drive unit assembly in driving engagement with said drive wheel, a battery mounted on said drive unit assembly, and upper and lower guide rollers mounted on said drive unit for rolling engagement with said upper and lower channel members of said main frame assembly, whereby said drive unit may be vertically articulated with said main frame and said drive wheel may maintain traction for driving said truck.

4. A fork lift truck comprising a main frame assembly, a pair of load wheels supporting one end of said main frame, a pair of caster wheels supporting the other end of said main frame, a mast mounted on said main frame, a lifting fork carried and supported by said mast, a pair of upper channel members mounted on said main frame assembly, a pair of lower channel members mounted on said main frame assembly, said upper and lower channel members being vertically related with respect to said main frame, said lower channel members being positioned rearwardly of said upper channel members, a power unit assembly, a drive wheel pivotally supporting said power unit assembly, a steering member connected to said drive wheel, motor means mounted within said drive unit assembly in driving engagement with said drive wheel, a battery mounted on said drive unit assembly, and upper and lower guide rollers mounted on said drive unit for rolling engagement with said upper and lower channel members of said main frame assembly, whereby said drive unit may be vertically articulated with said main frame and said drive wheel may maintain traction for driving said truck.

5. A fork lift truck comprising a main frame assembly including means for lifting a load to a predetermined range of height, ground engaging means for supporting said main frame assembly, a power unit assembly for driving said fork lift truck, said power unit assembly having at least one drive wheel adapted to be in ground engaging position for supporting and driving said power unit assembly, a first pair of spaced vertically orientated channel members mounted on one of said assemblies, a pair of guide rollers rotatably received in said first pair of channel members and mounted on the other of said assemblies, a second pair of spaced vertically orientated channel members mounted on one of said assemblies and spaced from said first pair, a second pair of guide rollers rotatably received in said second pair of spaced channel members and mounted on the other of said assemblies, whereby said assemblies may be vertically articulated with respect to each other, so that said drive wheel remains in ground engaging position.

6. A fork lift truck comprising a main frame assembly including means for lifting a load to a predetermined range of height, ground engaging means for supporting said main frame assembly, a power unit assembly for driving said fork lift truck, said power unit assembly having at least one drive wheel adapted to be in ground engaging position for supporting and driving said power unit assembly, a first pair of spaced vertically orientated channel members mounted on said main frame assembly, a pair of guide rollers rotatably received in said first pair of channel members and mounted on said power unit assembly, a second pair of spaced vertically orientated channel members mounted on said main frame assembly and spaced from said first pair, a second pair of guide rollers rotatably received in said second pair of spaced channel members and mounted on said power unit assembly, whereby said assemblies may be vertically articulated with respect to each other, so that said drive wheel remains in ground engaging position.

References Cited in the file of this patent

UNITED STATES PATENTS

| | | |
|---|---|---|
| 1,870,689 | Remde | Aug. 9, 1932 |
| 2,643,740 | Quayle | June 30, 1953 |
| 2,684,496 | Lull | July 27, 1954 |
| 2,693,290 | Elliott | Nov. 2, 1954 |
| 2,761,522 | Paradiso | Sept. 4, 1956 |
| 2,804,174 | Chasar | Aug. 27, 1957 |
| 2,959,235 | Hubbard et al. | Nov. 8, 1960 |